(12) United States Patent
Hannan

(10) Patent No.: US 12,058,719 B2
(45) Date of Patent: Aug. 6, 2024

(54) SYSTEMS AND METHODS FOR SPECTRUM ACCESS SYSTEM INTERFERENCE CALCULATION MANAGEMENT

(71) Applicant: CommScope Technologies LLC, Hickory, NC (US)

(72) Inventor: Ariful Hannan, Sterling, VA (US)

(73) Assignee: CommScope Technologies LLC, Claremont, NC (US)

( * ) Notice: Subject to any disclaimer, the term of this patent is extended or adjusted under 35 U.S.C. 154(b) by 394 days.

(21) Appl. No.: 17/584,084

(22) Filed: Jan. 25, 2022

(65) Prior Publication Data

US 2022/0264591 A1 Aug. 18, 2022

Related U.S. Application Data

(60) Provisional application No. 63/149,757, filed on Feb. 16, 2021.

(51) Int. Cl.
| | |
|---|---|
| H04W 72/12 | (2023.01) |
| H04W 16/14 | (2009.01) |
| H04W 52/24 | (2009.01) |
| H04W 52/30 | (2009.01) |
| H04W 52/36 | (2009.01) |
| H04W 72/10 | (2009.01) |
| H04W 72/14 | (2009.01) |

(Continued)

(52) U.S. Cl.
CPC ......... H04W 72/542 (2023.01); H04W 16/14 (2013.01); H04W 52/243 (2013.01); H04W 72/23 (2023.01)

(58) Field of Classification Search
None
See application file for complete search history.

(56) References Cited

U.S. PATENT DOCUMENTS

| | | | | |
|---|---|---|---|---|
| 11,476,923 B1 * | 10/2022 | Smyth | ............... | H04B 7/18513 |
| 11,595,917 B2 * | 2/2023 | Hannan | ............ | H04W 72/0446 |

(Continued)

OTHER PUBLICATIONS

WINNF-TS-0112, V1.9.1, Mar. 11, 2020, "Requirements for Commercial Operation in the US 3550-3700 MHz Citizens Broadband Radio Service Band", pp. Cover through 76, (c) 2020 The Software Defined Radio Forum Inc.

*Primary Examiner* — Pablo N Tran
(74) *Attorney, Agent, or Firm* — Fogg & Powers LLC

(57) ABSTRACT

Systems and methods for SAS interference calculation management are provided. In one embodiment, a system comprises: a processor coupled to a memory; a network interface configured to couple the SAS to a network, the processor coupled to the interface; and a grant request processing function executed by the processor, the grant request processing function processes grant requests received from radios located in a neighborhood defined around a protection area, wherein the requests comprises a request to transmit on a protected frequency channel of the protected area; wherein the grant request processing function manages a timing of when to processes interference calculations associated with the grant requests based on or both of: determining whether to steer a requesting radio to a non-protected frequency channel; and at least one Q/N estimate power calculation, wherein Q comprises a value of an allowed interference power limit, and N is a number of authorized radios.

20 Claims, 9 Drawing Sheets

(51) Int. Cl.
*H04W 72/23* (2023.01)
*H04W 72/542* (2023.01)

(56) References Cited

U.S. PATENT DOCUMENTS

| | | | |
|---|---|---|---|
| 2022/0225109 A1* | 7/2022 | Al-Mufti | H04W 52/243 |
| 2022/0346030 A1* | 10/2022 | Al-Mufti | H04W 52/367 |
| 2022/0361184 A1* | 11/2022 | Beck | H04W 16/14 |
| 2023/0007668 A1* | 1/2023 | Al-Mufti | H04W 16/14 |
| 2023/0098851 A1* | 3/2023 | Furuichi | H04W 28/16 455/450 |

* cited by examiner

SYSTEMS AND METHODS FOR SPECTRUM ACCESS SYSTEM INTERFERENCE CALCULATION MANAGEMENT

The present application claims benefit of U.S. Patent Application Ser. No. 63/149,757 (filed Feb. 16, 2021); the entire contents of the aforementioned patent application are incorporated herein by reference as if set forth in their entirety.

BACKGROUND

A citizen's broadband radio service (CBRS) includes incumbent users of a shared spectrum and secondary users of the shared spectrum. An incumbent user may also be referred to as a primary user. Higher priority users of the shared spectrum have first, or highest, priority to utilize the shared spectrum. Incumbent users have priority access to transmit in the spectrum shared over the secondary users. Thus, the operation of secondary users are therefore managed so that the receivers of higher priority users' communications systems or radios are able to operate free of interference from the devices of secondary users. Examples of higher priority users often include government operating systems such as communications systems, operators of fixed satellite communications systems, and grandfathered, prior licensees of the frequency spectrum. Communications systems, as used herein, shall include radar systems (or radars) and satellite ground stations. Free of interference as used herein does not mean an absence of interference, but rather means an acceptable level of interference which may be no interference or a finite level of interference. The acceptable level of interference may vary by geography, frequency spectrum, user type, license type, and/or other indicia.

Secondary users access the shared frequency spectrum by utilizing a citizen broadband radio service device (CBSD). More specifically, a CBSD is a radio that includes a transmitter coupled to an antenna. A CBSD may be used, for example, as part of a wireless network access point or telecommunications network base station. Within the context of the CBRS, there are different classes of CBSDs, namely general authorized access (GAA) CBSDs and priority access license (PAL) CBSDs. In the CBRS priority scheme, PAL users have second (or intermediate) priority, after incumbent users, to utilize the frequency spectrum. GAA users have the third (in this case, the lowest), priority under the CBRS priority scheme to utilize the frequency spectrum. GAA users may be permitted to operate a CBSD in the shared frequency spectrum when they do not interfere with communication systems of higher priority users (such as PAL or incumbent users).

A spectrum access system (SAS) is a component of the CBRS system which regulates the transmissions of GAA CBSDs under the SAS's control so that they do not interfere with PAL communication systems. As such, the SAS is the system that makes the determination as to whether to authorize a requesting secondary user to transmit in the spectrum shared with higher priority user(s) and/or the other secondary user(s) controlled by the SAS. However, while a SAS may have knowledge about the operation within a region of CBSDs that are subscribed as clients to its SAS services, there may be other CBSDs operating in the same region under the authorization and management of other SAS. Therefore, on periodic basis, each SAS executes a Coordinated Periodic Activities among SASes (CPAS) process during which it exchanges information with other SASes about CBSDs operating in the neighborhood of a priority access license (PAL) protection area (PPA). This process may be performed on a daily basis, typically at night, during a window of time referred to as a CPAS period.

During the limited time window of the CPAS period, the SAS performs a substantial number of interference power calculations using information exchanged with peer SASes and also retrieves other information from regulatory and/or CBRS standard organization data bases. In particular, during the CPAS period the SAS executes an iterative allocation process (IAP, defined in R2-SGN-16 of the WInnForum requirements) through which the SAS reallocates resources among CBSDs to adjust grant powers in an equitable way, and evaluates the viability of received grant requests from new CBSDs to ensure that authorizing those requests would not result in unacceptable interference levels within the PPA. These tasks become increasingly challenging to complete within the CPAS period when the number of CBSD operating in a neighborhood of a PPA grows to be quite large and where a substantial number of those CBSD are operating not under the management of the SAS, but instead are under the management of a peer SAS. Equipping a SAS with the corresponding sufficient processing resources to perform and complete the extensive number computations during the window of the CPAS period adds to the costs and complexity of each deployed SAS, with much of those deployed processing resources either underutilized or idle during times outside of the CPAS period.

For the reasons stated above and for other reasons stated below which will become apparent to those skilled in the art upon reading and understanding the specification, there is a need in the art for spectrum access system interference calculation management.

SUMMARY

The embodiments of the present disclosure provide methods and systems for spectrum access system interference calculation management and will be understood by reading and studying the following specification.

Systems and methods for spectrum access system interference calculation management are provided. In one embodiment, a system comprises: a processor coupled to a memory; a network interface configured to communicatively couple the spectrum access system to a network, the processor coupled to the network interface; and a grant request processing function executed by the processor, wherein the grant request processing function processes grant requests received via the network interface from radios located in a neighborhood defined around a protection area, wherein the grant requests comprises a request to transmit on a protected frequency channel of the protected area; wherein the grant request processing function manages a timing of when to processes interference calculations associated with the grant requests based on or both of: determining whether to steer a requesting radio to a non-protected frequency channel; and at least one Q/N estimate power calculation, wherein Q comprises a value of an allowed interference power limit associated with the protected area, and N comprises a value representing a total number of authorized radios operating in the neighborhood.

DRAWINGS

Embodiments of the present disclosure can be more easily understood and further advantages and uses thereof more readily apparent, when considered in view of the description of the preferred embodiments and the following figures in which:

FIG. 1 is a diagram illustrating an example embodiment for managing radio grant requests calculations received from radios in a neighborhood around a protection area;

FIGS. 2, 2A and 2B diagrams illustrating example method embodiments for processing radio grant requests from radios within a grant steering region;

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide systems and methods that manage the timing of when interference calculations are processed and other computations performed by a SAS to alleviate the processing burden on the SAS during CPAS periods. Some of the embodiments disclosed herein may be described in general terms, such as by using the general term "radio" for radio transceiver devices and equipment where a CBSD is one example of such a radio. Likewise, the term shared spectrum or shared spectrum system may be used where CBRS is an example of such a shared spectrum system. However, the terms CBRS and CBSD may be subsequently used when illustrating such a system and a device, or their specifications.

In some embodiments, to manage the timing of calculations associated with radio grant requests, a SAS executes a grant request processing function that is configured to determine whether and/or when to steer a requesting radio to use a non-protected frequency channel instead of a protected frequency channel. The grant request processing function further comprises and may execute one or more algorithms for performing Q/N estimate power calculations, which also serves to alleviate the processing burden on the SAS, because the Q/N estimate power calculations may themselves be performed outside of CPAS periods and in some embodiments, the results of those calculations utilized by the SAS to further reduce the number of calculations that need to be performed during the CPAS periods. For performing the Q/N estimate power calculations, Q represents the value of an allowed interference power limit for protected frequency cannels associated with the protected area. In some embodiments, the protected area may comprise a plurality of protection points. As the term is used herein, a protection point defines a lateral geographic location within a protected area which is to be protected from interference. Accordingly, Q represents the allowed cumulative interference power limit that is permitted to be received as observed at any of such protection points. As explained in greater detail below, the value of N represents the total number of authorized radios operating in the neighborhood that are authorized to transmit on the protected frequency channel.

Figure 1:
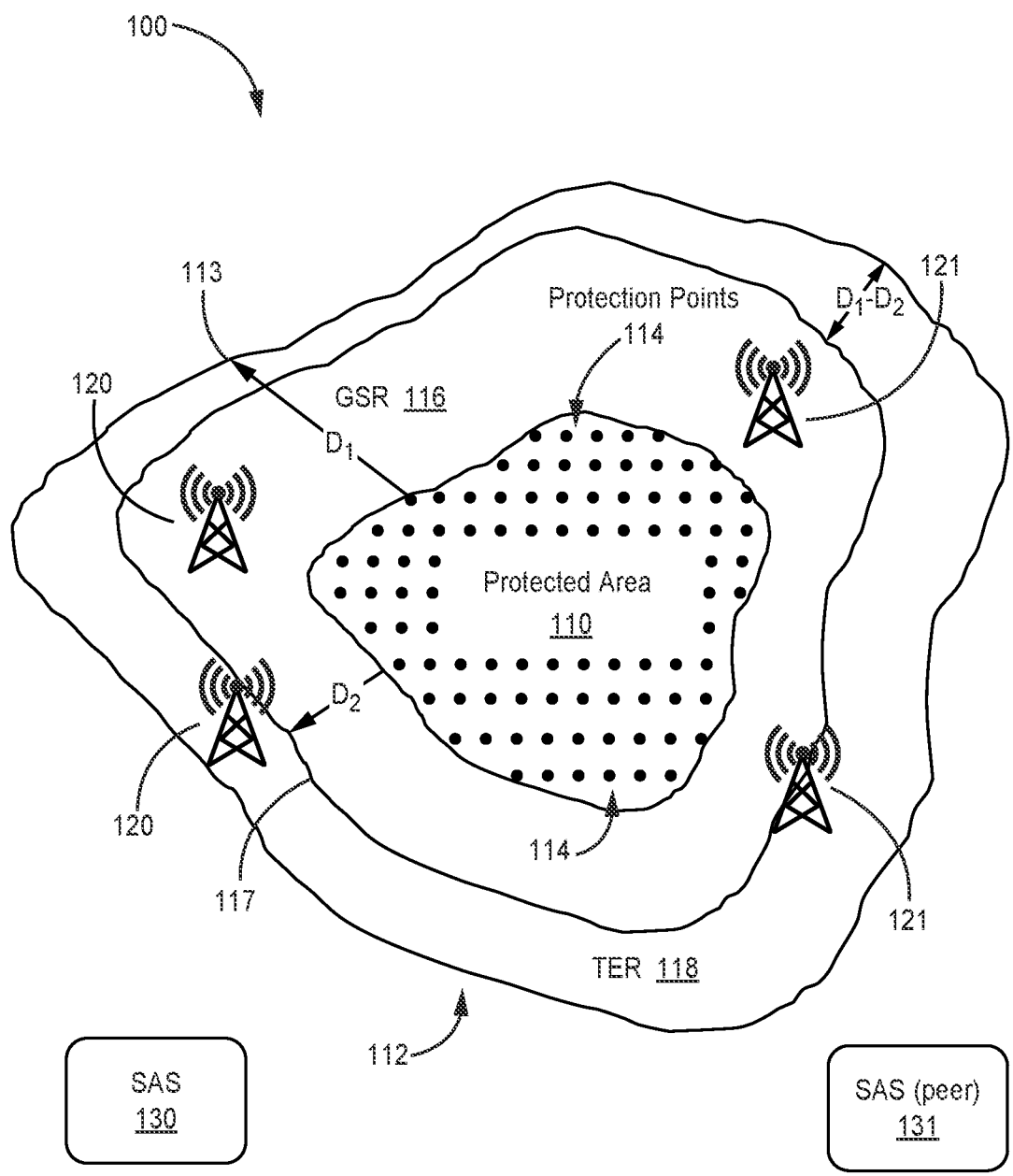

FIG. 1 is a diagram illustrating generally at 100 an example embodiment for managing calculations for authorizing radio grant requests in a neighborhood 112 around a protection area (PA) 110. In the embodiment shown in FIG. 1, the protection area 110 comprise a priority access license (PAL) protection area (PPA) within which PAL users conduct shared spectrum system operations on at least one protected frequency channel, $f_1$. In other embodiments, the protection area 110 may define a grandfathered wireless protection zone (GWPZ) or other exclusion zone or protection region. Those frequency channels protected by the PA and utilized by the PAL, GWPZ, or other priority users are referred to in this disclosure as "protected frequencies". The PA 110 may comprise any arbitrary closed shape surrounding a geographic region. Other radio located within the PA 110 will be banned from operating on the protected frequency channels $f_1$. In some embodiments, the outside boundary 113 of the neighborhood 112 may be defined as a linear distance, $D_1$, extending from a periphery of the PA 110.

Non-priority radios (such as GAA CBSDs) may operate within the neighborhood 112 of the PA 110 under the authorization of a spectrum access system (SAS). For example in FIG. 1, one or more radios (shown at 120) may operate within the neighborhood 112 under a grant authorized by a first SAS 130. Those radios 120 may each be referred to as a client radio 120 of the first SAS 130. One or more other non-priority radio (shown at 121) may operate within the neighborhood 112 under a grant authorized by a second SAS 131. In other embodiments, any number of different shared spectrum radios may operate in neighborhood 112 under grants from any one of a plurality of SAS. From the perspective of the SAS 130, the SAS 131 (any other SAS managing radio within the neighborhood 112) is considered, and referred to herein, as a "peer SAS". Accordingly, from the perspective of the SAS 130, the radio 121 managed by a peer SAS 131 may be considered, and referred to herein, as peer radios 121. While the radios 120, 121 are located outside of the PA 110, their transmissions (if transmitted on one of the protected frequencie channels), may still interfere with operations within the PA 110 depending on the transmit power and path loss and for that reason their operations are managed by one of the respective SAS 130, 131. Radios that are GAA CBSDs are typically one be of two types: category A (low transmission power) and category B (high transmission power). Category A has a maximum transmission power spectral density of 30 dBm/10 MHz. Category B has a maximum transmission power spectral density of 47 dBm/10 MHz.

As will be further discussed by this disclosure, SAS 130 executes a grant request processing function that performs radio frequency (RF) power estimates utilizing what is referred to herein as a Q/N estimate which can be explained in general as follows. The SAS 130 is assigned the task to manage its client radios 120 such that the region within the PA 110 will be free of interference from radios operating within the neighborhood 112. In other words, the cumulative interference power from both client radios 120 and peer radios 121 as observed from any of the protection points 114 within the PA 110 should kept less than a predetermined allowed interference power limit for PA 110, which is referred to herein as "Q". In some embodiments the allowed interference power limit, Q, may be an interference power between −80 dBm/10 MHz and −96 dBm/10 MHz, for example. As observed at each protection point 114, it is acceptable if the cumulative interference power cause by the transmissions from all of the radios in the neighborhood 112 is less than the allowed interference power limit, Q, and unacceptable if the cumulative interference power exceeds that allowed interference power limit at any protection point 114 within PA 110.

In addition to Q, the Q/N estimate is also a function of the variable, N, which represents the total number of authorized radios (both client radios 120 and peer radios 121) operating in the neighborhood 112. Since N represents a dynamically changing parameter that may change at the next CPAS, the value used for N in a Q/N estimate may come from difference sources depending on the circumstances. For example, the value of N may be an estimate based on the Full Activity Dump (FAD) exchange performed during the most recent CPAS period, which is denoted in this disclosure as "$N_0$". When a Q/N estimate is performed during a CPAS period, a value of N may be an estimate based on the FAD exchange performed during that CPAS period, which is denoted in this disclosure as "$N_1$". An accurate updated value for N may also be obtained for a Q/N estimate performed during a CPAS period as a result from an IAP executed during that CPAS period (assuming an IAP is performed during that CPAS period), which is denoted in this disclosure as "$N_U$".

Given values for Q and N, then an acceptable average interference power limit for any transmissions from each of the N radios can be expressed as Q/N (i.e., Q divided by N). For example, the actual interference signal power, $P_I$, contributed by any one radio to the cumulative interference signal power received at a protection point 114 is computable by the SAS 130 utilizing a function which may be expressed as:

$$P_I = f(P_{TX}, PL)$$

where $P_{TX}$ is the transmitting power of the radio and PL is the path loss between that radio and the particular protection point 114. In this expressions, it should be understood that the antenna gain, $G_T$ of the transmitter and the antenna gain, $G_R$ of the receiver can be included components of the path loss PL in some embodiments. That is, the interference signal power, $P_I$ can also be expressed as:

$$P_I = f(P_{TX}, PL, G_T, G_R)$$

where PL is instead optionally considered as the pass loss between the transmitting and receiving antennas. For the balance of the discussion below, PL is considered to include the losses of $G_T$ and $G_R$. Therefore, if the maximum acceptable interference power, received from any one radio is defined as $P_I = Q/N$, then the above expression can be rewritten to solve for an acceptable radio transmit power limit $P_{TX-L}$ as:

$$P_{TX-L} = f(P_I, PL) = f(Q/N, PL)$$

Utilizing this expression, if a radio 120 is requesting a grant to transmit at a requested power, $P_R$, that does not exceed the computed $P_{TX-L}$, then for that protection point 114, granting the request will not cause the received $P_I$ from the requesting radio 120 to exceed Q/N. Similarly managing the transmit power of each radio 120 in neighborhood 112 based on their respectively computed $P_{TX-L}$ provides assurance that the cumulative interference power received at that protection point 114 should not exceed the allowed interference power limit, Q.

With the above in mind, when the SAS 130 receives a new radio grant request asking for authorization for a new radio 120 to operate within the PA 110, the SAS 130 will ensure that granting the request will not cause the cumulative sum interference signal power caused by the total number N of radio 120, 121 operating within the neighborhood 112 to be in excess of Q as observed from within the PA 110. The SAS 130 considers the cumulative interference signal power as received at each of the plurality of protection points 114 established at locations throughout the PA 110. If the SAS 130 determines that authorizing a new radio grant request on the PA 110's protected frequency would cause the cumulative interference signal power at any one of the protection points 114 to exceed the predetermined cumulative interference power limit Q, then the authorization for that new radio grant request may be denied and a recommendation provided to the radio to request access on another (non-protected, non-PAL) frequency.

It should be noted that the interference signal power, $P_I$, contributed by a radio to the cumulative interference signal power received at a protection point 114 is a function both of the radio's transmit power and the path loss between the radio and the protection point 114. The path loss may be calculated based on factors such as distance between the radio 120 and the protection point 114 and the nature of the geographic terrain between the radio 120 and the protection point 114. For example, in some embodiments, the SAS 130 may execute an algorithm to calculate path loss utilizing an Irregular Terrain Model (ITM) which estimates radio propagation losses for frequencies as a function of distance and the variability of the signal in time and space based on electromagnetic theory and signal loss variability expressions. It should be understood that while the terrain features contributing to path loss may include naturally occurring features such as hills and valleys, in some embodiments they may also comprise man-made obstructions (such as buildings, for example). In some embodiments, the SAS 130 may execute the ITM in an area prediction mode to calculate path loss when a terrain profile is not available, and use a point-to-point prediction mode when a terrain profile is available. In other embodiments, other methods for computing path loss may be utilized by the SAS 130.

As also shown in FIG. 1, in some embodiments in order to manage and alleviate the processing burden on the SAS 130 during CPAS periods, the neighborhood 112 is subdivided into two regions: a grant steering region (GSR) 116 and a transmit power estimation region (TER) 118.

The GSR 116 extends out a distance $D_2$ from the periphery of the PA 110, while the TER 118 starts at the periphery 117 of the GSR 116 and may extend out to the outside boundary 113 of the neighborhood 112. In some embodiments, the outer periphery of the GSR 116 may be determined strictly as a function of a selected distance. In other embodiments, the outer periphery of the GSR 116 may be at a distance from the PA 110 determined from at least one RF parameter. For example, points along the periphery of the GSR 116 may be determined based on RF considerations such as the points all having a similar RF signal path loss to a point on the PA 110. In other embodiments, whether a requesting radio 120 is considered with the GSR 116 may be defined based on a radio equipment characteristic, such as but not limited to radio device power, category or antenna height.

When the SAS 130 receives a new radio grant request to use a protected frequency channel, $f_1$, from a radio 120 located within GSR 116 the SAS 130 will in most instances steer the requesting radio 120 to instead request use of another, non-protected, frequency channel. In contrast, when the SAS 130 receives a new radio grant request from a radio 120 located within the TER 118 to use a protected frequency channel, $f_1$, the SAS 130 will utilize Q/N estimate power calculations. These Q/N estimate power calculations do not reply on computing interference power contributed by peer radios or on saving and retrieving potentially massive numbers of path loss values between every protection point 114 and every radio operating within the PA 110. As such, utilizing Q/N estimate power calculations further alleviates the computation burden on the SAS 130.

Figure 2:
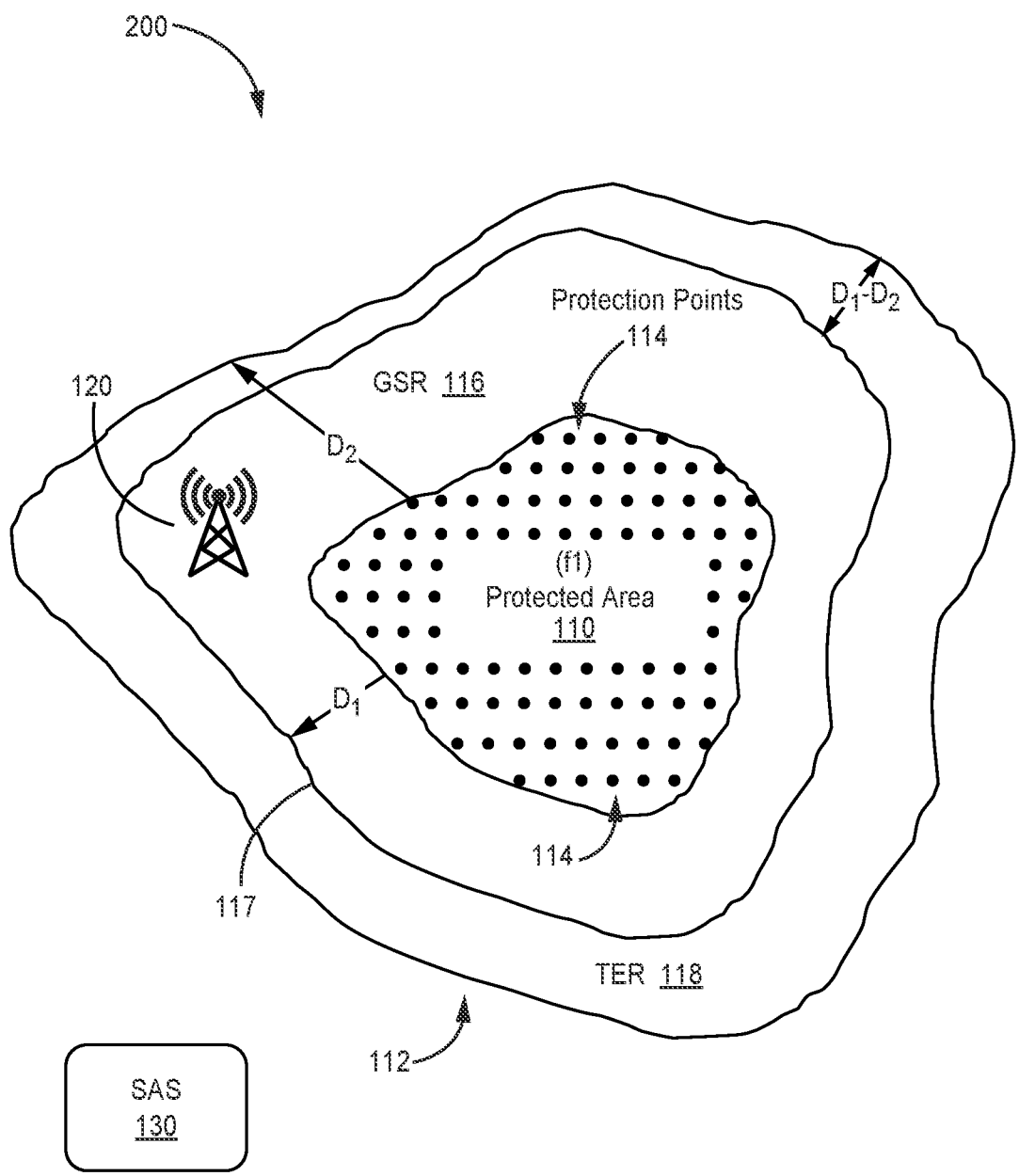
Figure 2A:
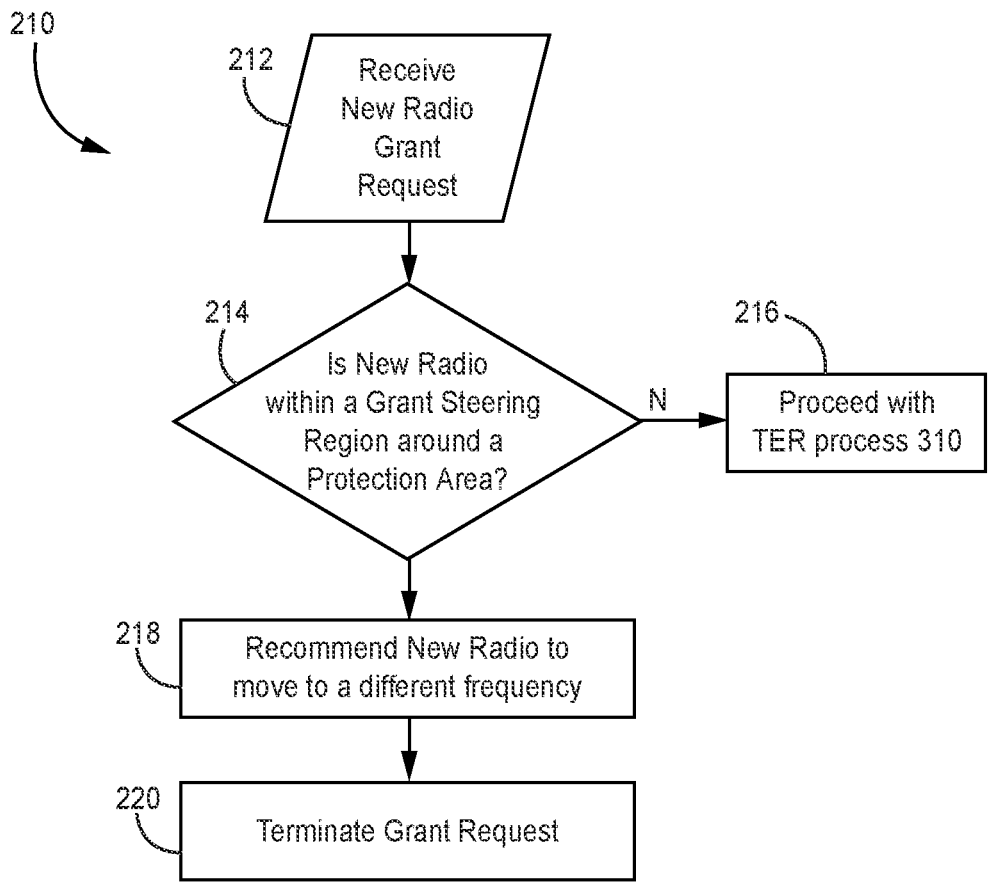
Figure 2B:
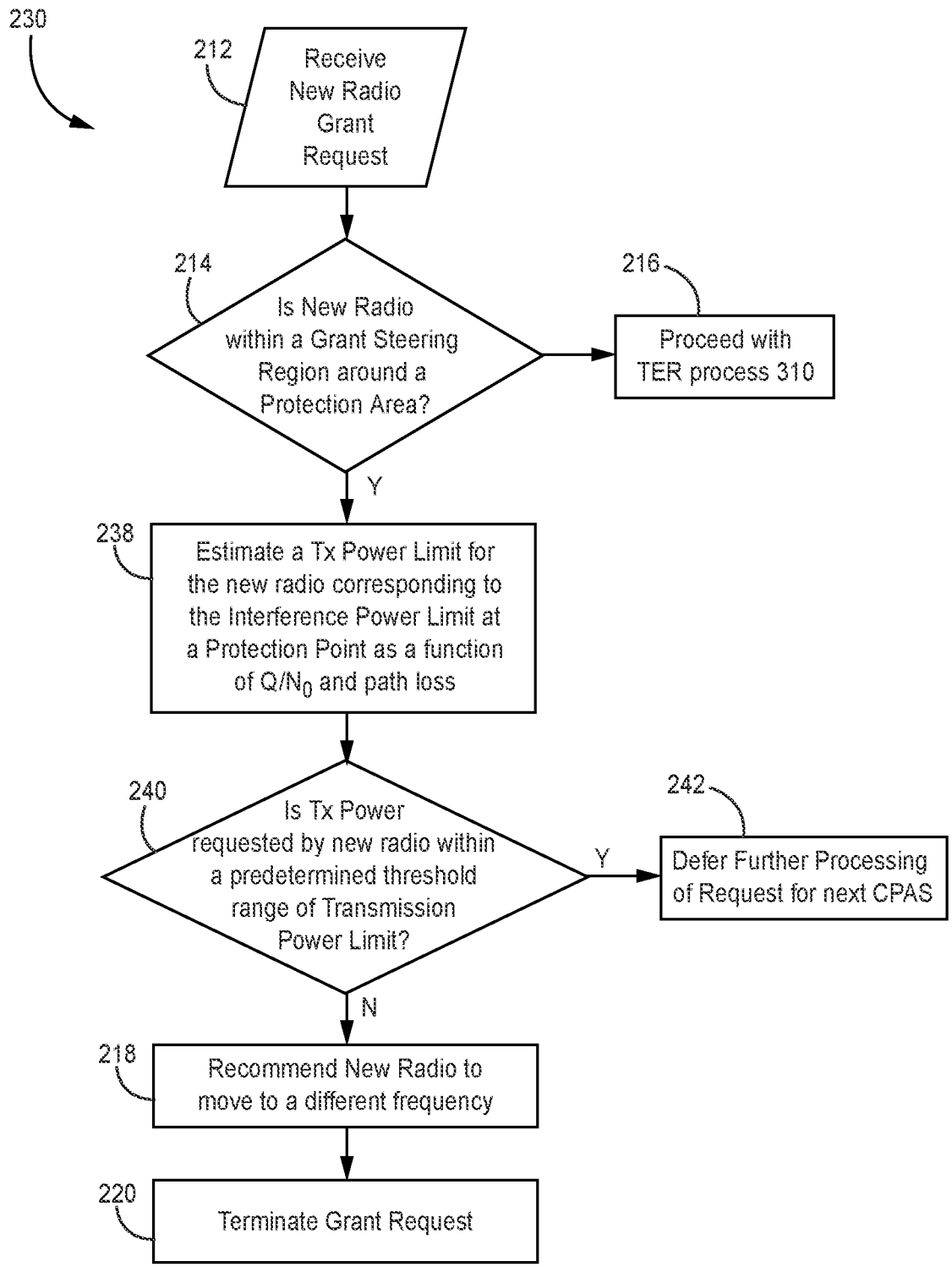

FIGS. 2, 2A and 2B illustrate example grant steering method embodiments which may be utilized by the SAS 130. As illustrated in FIG. 2 at 200, a new radio 120 is deployed within the GSR 116 of the neighborhood 112 which surrounds PA 110. In one method 210 shown in FIG. 2A, the SAS 130 receives a new radio grant request at 212 for authorization to use a protected frequency channel, $f_1$, and determines at 214 if the new radio 120 making the request is located within the GSR 116. If it is not, then the requesting radio 120 is instead within the TER 118 and the SAS 130 may proceed as shown at 216 to the TER process method 310 discussed below. For this example, the radio 120 is within the GSR 116. Accordingly the SAS 130 at 218 responds to the requesting radio 120 with a recommendation to instead submit a grant request to utilize a non-protected frequency channel. In some embodiments, the SAS 130 may also optionally communicate to the requesting radio 120 that its initial grant request is terminated (shown at 220). Utilizing method 210 provide the option to SAS 130 to implement a streamlined process that will always steer requesting radio 120 away from utilizing protected frequency channels.

FIG. 2B illustrates an alternative method 230 for processing a grant request from a radio 120. Method 230 provides the option to SAS 130 to implement a more detailed analysis that determines whether authorizing the requesting radio 120 to utilize a protected frequency channel, $f_1$, is potentially feasible. In this method, the SAS 130 again receives a new radio grant request at 212 for authorization to use a protected frequency channel, $f_1$, with the request specifying a requested transmit power, $P_R$. The SAS 130 determines at 214 if the new radio 120 making the request is located within the GSR 116. If it is not, then the requesting radio 120 is instead within the TER 118 and the SAS 130 may proceed as shown at 216 to the TER process method 310 discussed below. For this example, the radio 200 is within the GSR 116. Accordingly, utilizing method 230 the SAS 130 may proceed to 238 to perform an Q/N estimate transmit power limit calculation at 224 for $P_{TX-L}$. The method process to 240 to determine if the requested power, $P_R$, is within a predetermined range of the computed $P_{TX-L}$, (for example, whether $P_R$ is within a predetermined range of 6 dB of $P_{TX-L}$). For this computation, the $P_{TX-L}$ may be calculated as $$P_{TX-L} = f(Q/N_0, PL)$$

utilizing the $N_0$ estimate from the FAD exchange performed during the most recent CPAS period. In some embodiments, method 230 determines the transmit power limit, $P_{TX-L}$, for the requesting radio 120 at a plurality of the protection points 114 of PA 110 as a function of $Q/N_0$ and the path loss, and if the requested transmit power $P_R$ is within the predetermined range of the computed $P_{TX-L}$ at each of the respective protection points 114, then granting the request to use the protected frequency, $f_1$, within the GSR 116 may be feasible. The SAS 130 may therefore decide to defer and further process calculations for the grant request during the next CPAS (shown at 242). If instead the requested transmit power $P_R$ is not within the predetermined range of $P_{TX-L}$ for each of the respective protection point s114, the SAS 130 proceeds to 218 and responds to the radio 120 making the request with a recommendation to instead submit a grant request to for another frequency channel not protected by the PA 110. In some embodiments, the SAS 130 may optionally communicate back to the requesting radio 120 that its initial grant is terminated (shown at 220). Method 230, thus provides the SAS 130 with the option to consider radio grant requests where the requestor is not requesting a significant transmission power, or is otherwise located where there is substantial path loss. In such cases, $P_I$ (and thus the potential for interference) is expected to be low and by further considering the request, the SAS 130 can attempt to more fully utilize the shared spectrum. However, a substantial number of grant requests to utilize a protected frequency channel within the GSR 116 are not likely to meet those conditions and will continue to be steered to a non-protected frequency channel. As such, under method 230 the computation burden on the SAS 130 during the next CPAS is still at least in part alleviated.

Figure 3:
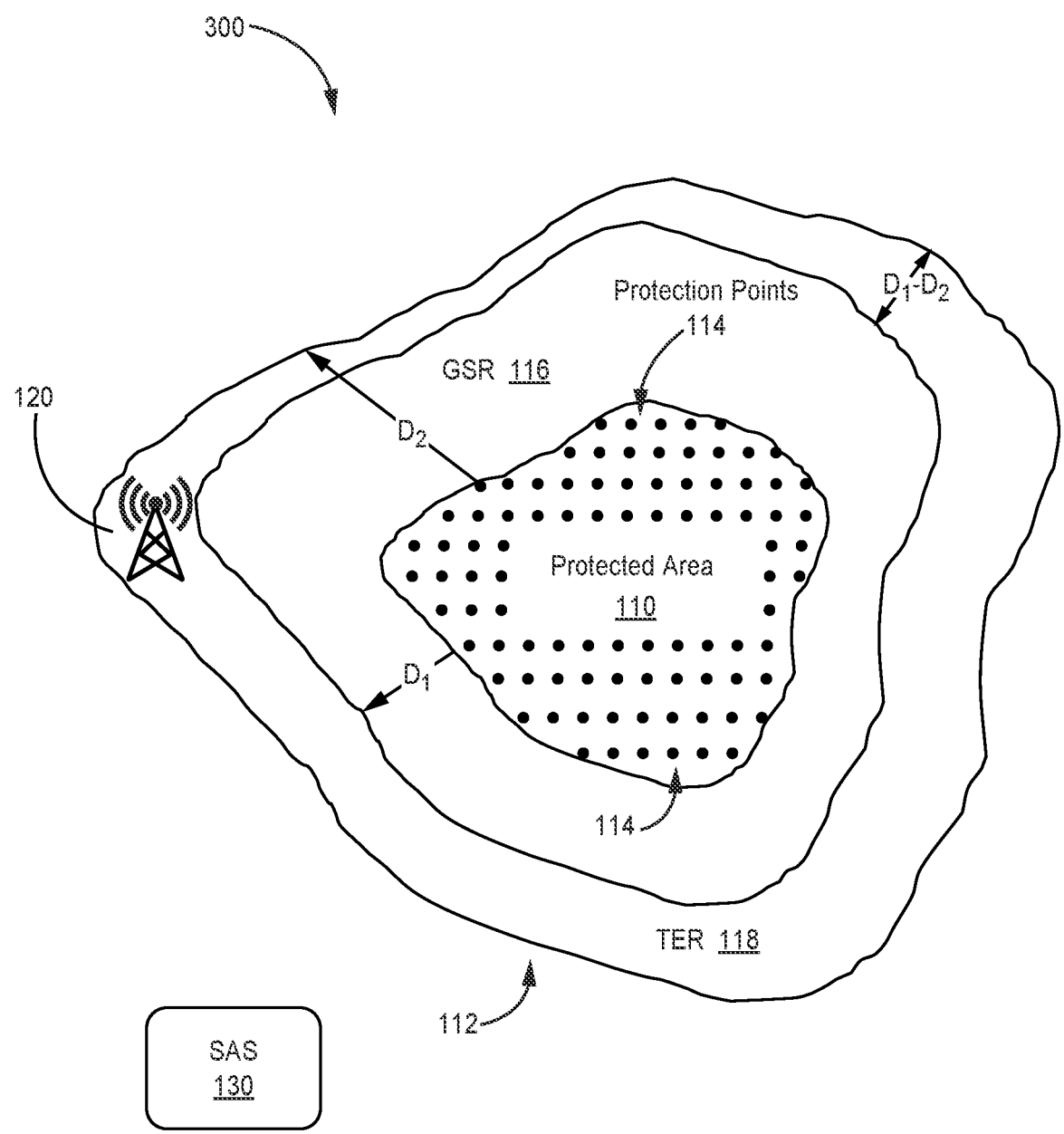
FIGS. 3 and 3A are diagrams illustrating an example method embodiment for processing radio grant requests from radios within a transmit power estimation region.
Figure 3A:
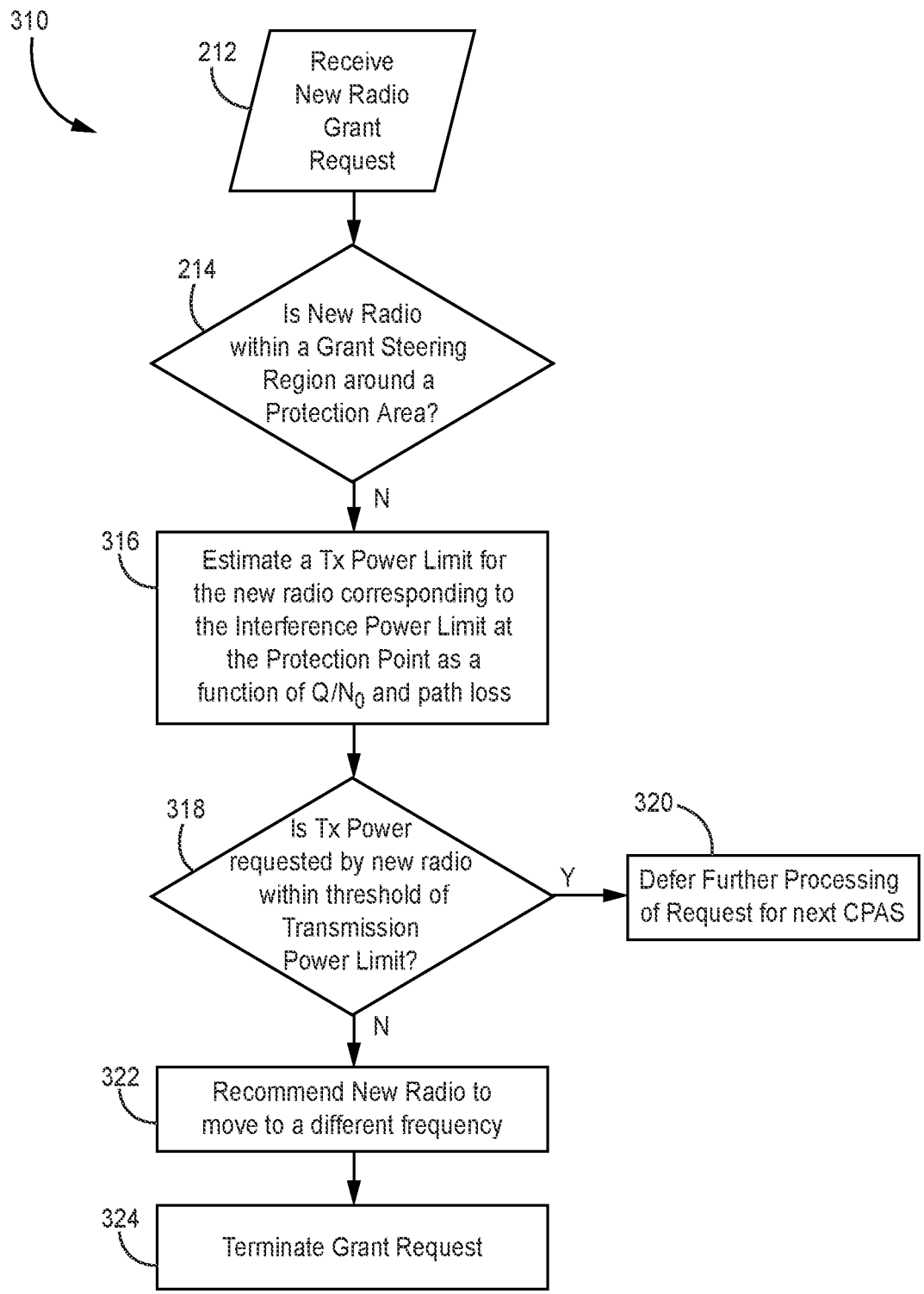

FIGS. 3 and 3A illustrate an example TER process embodiment which may be utilized by the SAS 130. As illustrated in FIG. 3 at 300, for this scenario a new radio 120 is deployed within the TER 118 of the neighborhood 112 which surrounds PA 110. With the method 310 shown in FIG. 3A, the SAS 130 may have already executed the previously described blocks 212 and 212 to confirm that the new requesting radio 120 is not within the GSR 116 and therefore proceeds to block 316 of method 310 to perform a Q/N estimate transmit power limit calculation for $P_{TX-L}$. That is, a transmit power limit is estimated (as a function of Q/No and path loss) for the new radio 120 corresponding to the interference power limit at a protection point. The method proceeds to 318 to determine if the requested power, $P_R$, is within a predetermined range of the computed $P_{TX-L}$, (for example, whether $P_R$ is within a predetermined range of 6 dB of $P_{TX-L}$). The $P_{TX-L}$ may be calculated as:

$$P_{TX-L} = f(Q/N_0, PL)$$

utilizing the $N_0$ estimate from the FAD exchange performed during the most recent CPAS period. In some embodiments, the method at 318 determines the transmit power limit, $P_{TX-L}$, for the requesting radio 120 at a plurality of the protection points 114 of PA 110 as a function of Q/No and the path loss, and if the requested transmit power $P_R$ is within the predetermined range of the computed $P_{TX-L}$ at each of the respective protection points 114, then granting the request to use the protected frequency, $f_1$, within the GSR 116 may be feasible. The SAS 130 may therefore decide to defer and further process calculations for the grant request during the next CPAS (shown at 320). If instead the requested transmit power $P_R$ is not within the predetermined range of $P_{TX-L}$ for each of the respective protection points 114, the SAS 130 proceeds to 320 and responds to the radio 120 making the request with a recommendation to instead submit a grant request to for another frequency channel not protected by the PA 110. In some embodiments, the SAS 130 may optionally communicate back to the requesting radio 120 that its initial grant is terminated (shown at 322). Method 310, thus provides the SAS 130 with the option to make an initial evaluation of a radio grant request based on Q/N estimates of power prior to committing computational resources to evaluate the radio grant request at the next CPAS. If the initial evaluation at 418 and 420 reveals that the request is likely not grantable, then successfully steering the requesting radio 120 to a non-protected frequency channel removes the need to process the request during the CPAS. The SAS 130 will thus be able utilize its computing resources during the limited CPAS period to evaluate radio grant requests that are pre-screened to have a higher likelihood of being grantable.

Figure 4:
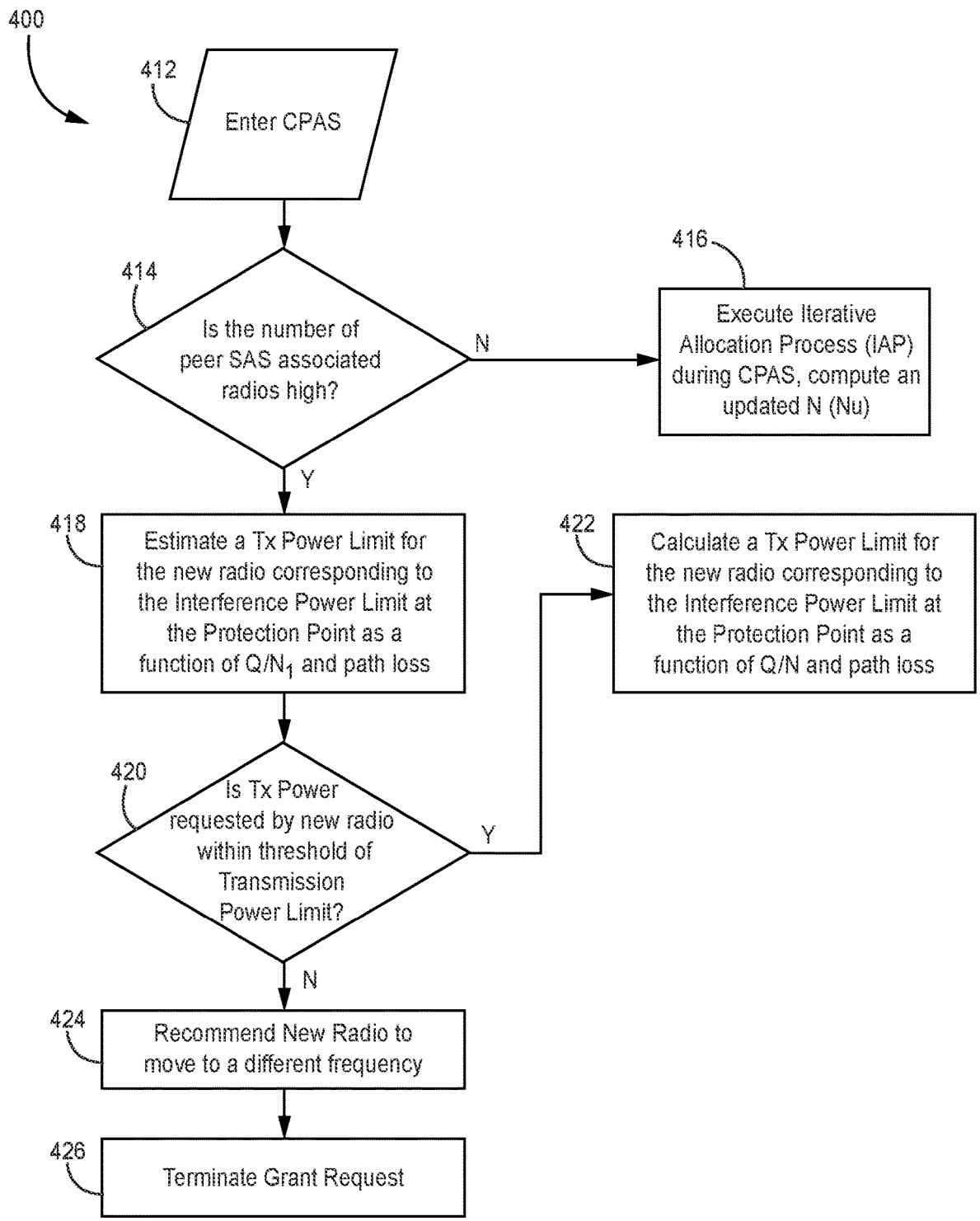
FIG. 4 is a diagram illustrating an example method for further processing radio grant requests during a CPAS period.

FIG. 4 illustrates at 400 an example method embodiment which may be utilized by the SAS 130 during a CPAS period to complete the processing of radio grant requests initially processed by the GSR and TER methods described above. However, it should be understood that in other embodiments method 400 may be implemented by a SAS as a stand-alone method. At 412, the SAS 130 executing method 400 enters the CPAS period and at 414 determines if the number of peer radios 121 in the neighborhood 112 being managed by one or more peer SAS 131 is high (i.e., higher than an established peer radio threshold). In one embodiment, the one or more peer SAS 131 would each report to the SAS 130 the number of radios 121 that they are managing and the SAS 130 at 414 would sum those reported numbers and compare it to the established peer radio threshold. If the total number of peer radio 121 reported during the CPAS period is not high, then the computational burden on the SAS 130 should be relatively limited so that the SAS 130 may proceed to 416 and execute the IAP during the CPAS. As explained above, execution of the IAP will determine the aggregate interference power from the client and peer radios present at each protection point 114 of the PA 110. The SAS 130 will also establish the updated value $N_U$. The method may proceed to 422 to calculate $P_{TX-L}$ for the grant requesting radio 120 (at each protection point 114) utilizing a Q/N estimate where N is the updated value $N_U$. The SAS 130, during the CPAS, may therefore determine if the requested power, $P_R$, can be granted to the requesting radio 120 based on comparing the requested power, $P_R$, to the $P_{TX-L}$ at each protection point 114. Moreover, the Q/N estimate at a protection point 114 for the requesting radio 120 can thus be performed during the CPAS without the need to compute path losses to that protection point 114 for any other radio.

If the total number of peer radios 121 reported during the CPAS period is high (e.g. higher than the established peer radio threshold), then the computational burden on the SAS 130 to execute the IAP during the CPAS may be considerable. Accordingly, execution of the IAP during that CPAS may be skipped. Instead, the method proceeds to 418 to perform a Q/N estimate transmit power limit calculation for $P_{TX-L}$ for each protection point 114. The $P_{TX-L}$ may be calculated as $$P_{TX-L} = f(Q/N_1, PL)$$

utilizing the $N_1$ estimate from the FAD exchange performed during the current CPAS period.

The method proceeds to 420 to determine if the requested power, $P_R$, is within a predetermined range of the computed $P_{TX-L}$, (for example, whether $P_R$ is within a predetermined range of 6 dB of $P_{TX-L}$). If not, the method proceeds to 424 and responds to the radio 120 making the request with a recommendation to instead submit a grant request to for another frequency channel not protected by the PA 110. In some embodiments, the SAS 130 may optionally communicate back to the requesting radio 120 that its initial grant is terminated (shown at 426).

If the requested power, $P_R$, is within a predetermined range of the computed $P_{TX-L}$, then the calculation of the grand request is maintained for processing in the CPAS period and the method proceed to 422. The SAS 130 calculates $P_{TX-L}$ for the grant requesting radio 120 (at each protection point 114) utilizing a Q/N estimate where N is the updated value $N_U$ established during the CPAS. The SAS 130, during the CPAS, may determine if the requested power, $P_R$, can be granted to the requesting radio 120 based on comparing the requested power, $P_R$, to the $P_{TX-L}$ at each protection point 114. Moreover, the Q/N estimate at a protection point 114 for the requesting radio 120 can thus be performed during the CPAS without the need to compute path losses to that protection point 114 for any other radio.

In some embodiments, once a SAS 130 grants authorization to operate radio 120 at a requested power, $P_R$, the authorization to operate may be valid for an indefinite period of time, but a radio 120's authorized maximum transmission power may be adjusted by the SAS 130 from time to time. For example, in some embodiments, an authorized radio 120 may periodically reconfirm with the SAS 130 it is permitted to continue to operate at its current authorized maximum transmission power. The total number, N, of client and peer radios operating in the neighborhood 112 may have substantially increased, meaning that the permissible transmit power limit per $P_{TX-L}=f(Q/N, PL)$ for a particular radio 120 may no longer be valid. In that case, the SAS 130 may determine if the radio 120's authorized maximum transmission power is still within a predetermined range of the newly computed $P_{TX-L}$, (for example, whether $P_R$ is within a predetermined range of 6 dB of the new $P_{TX-L}$), and if not, communicate to that radio 120 an updated authorized maximum transmission power based on the newly computed $P_{TX-L}$.

It should be noted that in some embodiments, a new radio 120 requesting a grant to operate from the SAS 130 may be located in an area that falls within an overlapping region of neighborhoods 112 for two or more PA 110 (which may, or may not, operate with different protected frequencies). In that case, the SAS 130 may evaluate the new radio grant request with respect to each of the neighborhoods 112 utilizing any of the method described herein, with the determination of whether to defer and further process the grant request during the next CPAS based on the most restrictive Q/N estimate of $P_{TX-L}$.

Figure 5:
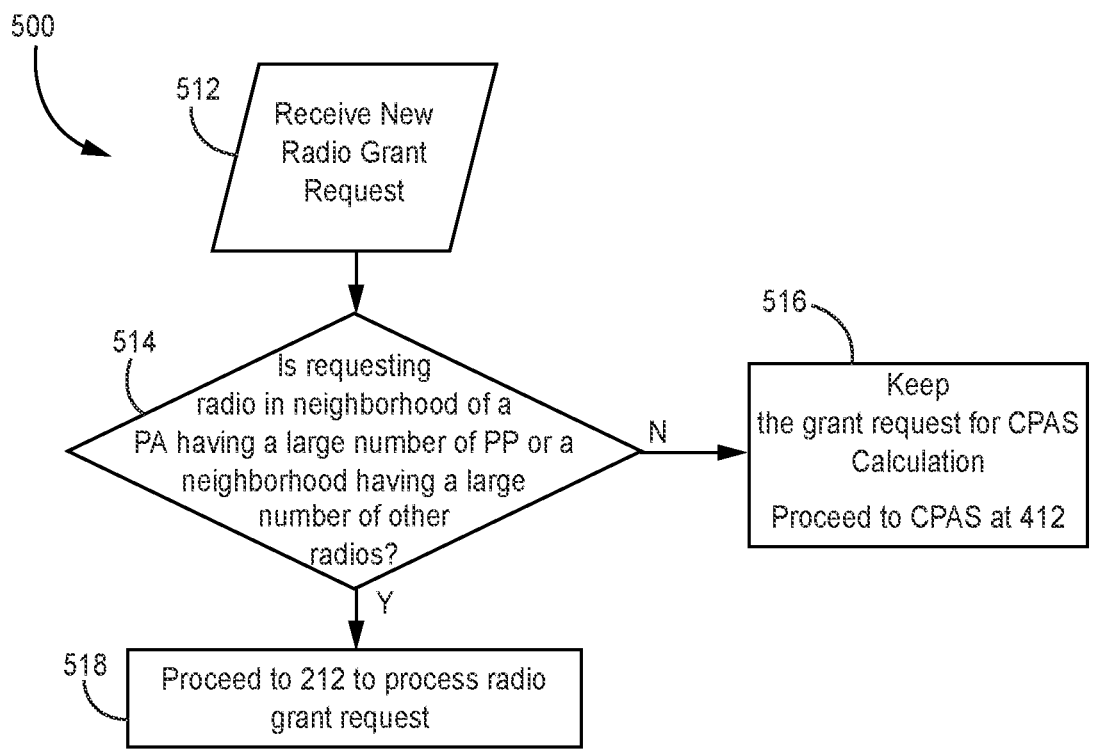
FIG. 5 is a diagram illustrating an example method embodiment for an optional initial evaluation that may be executed by a SAS when a new radio grant request is received.

FIG. 5 is a diagram illustrating a method 500 for an optional evaluation that may be executed by the SAS 130 when a new radio grant request is initially received. In this method 500, an new radio grant request is received at 512 and at 514 the SAS 130 determines if the new radio grant request is from a radio 120 that either: 1) is located in a neighborhood 112 for a PA 110 that comprises a large number of protection points 114 (e.g., greater than a pre-established threshold) or 2) is located in a neighborhood 112 that comprises a large number, N (e.g., greater than a pre-established threshold) of other radios (where the value of N may be an estimate based on $N_O$, from the FAD exchange performed during the most recent CPAS period). Both of these two parameters are factors with respect to the number of interference power calculations the SAS 130 performs when evaluating a grant request. Accordingly, if the determination at 514 is "yes" then method proceeds at 518 to begin the process at 212 of FIG. 2A or 2B described above. If the determination at 514 is "no" then the method proceeds to 516 to process the radio 120 grant request at the next CPAS (for example, proceed to 412 of FIG. 4). In one embodiment, the SAS 130 may begin calculating the relevant path losses for all or a subset of the protection points 114 in preparation for the next CPAS period.

Figure 6:
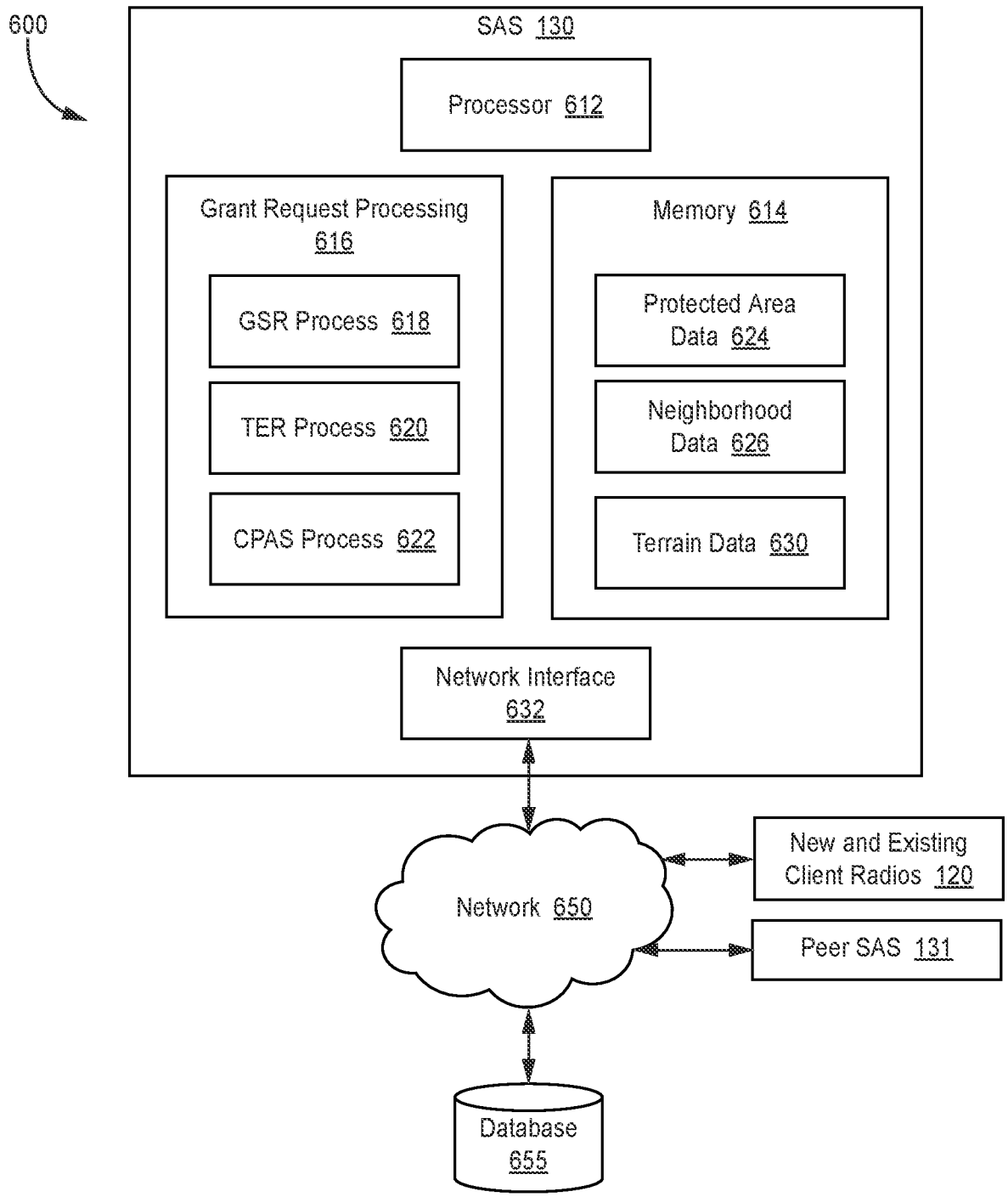
FIG. 6 is a block diagram illustrating an example embodiment of a SAS.

FIG. 6 is a block diagram illustrating at 600 an example embodiment of a SAS 130. It should be understood that the features and elements described herein with respect to the SAS 130 of FIG. 6 may be used in conjunction with, in combination with, or substituted for elements of any of the other embodiments discussed herein and vice versa. Further, it should be understood that the functions, structures and other description of elements for embodiments described in FIG. 6 may apply to like or similarly named or described elements across any of the figures and/or embodiments describe therewith and vice versa.

In the embodiment shown in FIG. 6, the SAS 130 includes at least one processor 612 coupled to a memory 614, which together execute code to implement the various functions, methods, and features of the SAS 130 described and disclosed herein. Optionally, the SAS 130 comprises software stored in and executed by the at least one processor 612 such as a state machine, a neural network, and/or a quantum computer. In some embodiments, the state machine comprises processor circuitry coupled to memory 614. The processor 612 may execute the software stored in the memory 614 to implement aspects of the SAS 130. The SAS 130 implemented in a processing circuitry may be referred to as SAS circuitry. Although the SAS 130 is illustrated in FIG. 6 as a singular computing system, it should be understood than in other embodiments the functions and elements of the SAS 130 described herein may be distributed over several computing systems.

The SAS 130 also includes at least one network interface 632 configured to communicatively couple the SAS 130 to a network 650 (such as the Internet, or a SAS operator's proprietary network, for example). In some embodiments, the SAS 130 via network 650, is optionally further communicatively coupled to at least one external database 655. In some embodiments, the database 655 comprises a database of data about incumbent users (e.g., location of protection point(s) of incumbent user, type of incumbent user, and corresponding interference threshold). Optionally, the external database 655 may be managed by a government agency (e.g., the U.S. Federal Communications Commission) and/or by a standard body (e.g., WInnForum).

The SAS 130 includes a grant request processing function 616 which is executed by the processor 612 and comprises code for spectrum access system interference calculation management. In some embodiments, the grant request processing function 616 comprises a GSR process 618 to evaluate grant requests for new radios 120 located in the GSR 116 of a neighborhood 112 as discussed above. The grant request processing function 616 also comprises a TER process 620 to evaluate grant requests for new radios 120 located in the TER 118 of a neighborhood 112 as discussed above. The grant request processing function 616 also comprises a CPAS process 622 for performing interference calculations, IAP functions, FAD exchanges, and other operations of the SAS 130 performed in preparation for, or during, CPAS periods.

As shown in FIG. 6, the memory 614 may store PA data 624 which defines the boundaries of one or more PA 110, the locations of protection points 114 within those PA 110, and identifies one or more protected frequency channels associated with each PA 110 that are protected for use by priority users (such as PAL users, for example). Other information determined from the prior CPAS period, such as the number N for a PA 110 or other exchanged FAD data, may also be stored as PA data 624 or elsewhere in memory 614.

In the embodiment shown in FIG. 6, the memory 614 also stores neighborhood data 626 that includes the boundaries of the GSR 116 and TER 118 for one or more neighborhoods around the PA 110 identified by the PA data 624. The neighborhood data 626 may further include the locations of client radio 120 that are under the management of the SAS 130 and optionally locations of one or more peer radios 121. In one embodiment, the grant request processing function 616 may access the PA data 624 and/or neighborhood data 626 to determine whether the location of a new radio 120 requesting authorization to operate is within the GSR 116 or TER 118 or to obtain other information in order to execute the GSR process 618, the TER process 620 and/or the CPAS process 622. In other embodiments, the grant request processing function 616 may access other information from the memory 614, PA data 624 and/or neighborhood data 626 to implement other functions performed by the SAS 130. For example, in some embodiments the memory 614 may further comprise terrain data 630 that is accessed by the Irregular Terrain Model (ITM) or other radio propagation loss function for calculating path loss values used for Q/N estimates or other purposes.

For example, in some embodiments, the SAS 130 may execute an algorithm to calculate path loss for frequencies as a function of distance and the variability of the signal in time and space based on electromagnetic theory and signal loss variability expressions. It should be understood that while the terrain features contributing to path loss may include naturally occurring features such as hills and valleys, in some embodiments they may also comprise man-made obstructions (such as buildings, for example). In some embodiments, the SAS 130 may execute the ITM in an area prediction mode to calculate path loss when a terrain profile is not available, and use a point-to-point prediction mode when a terrain profile is available. In other embodiments, other methods for computing path loss may be utilized by the SAS 130.

In one embodiment, the SAS 130 may communicate with new and existing client radios 120 via the network interface 632 connection to the network 650. For example, a new client radio 120 may send the SAS 130 a new radio grant request via the network 650. The SAS 130 receives the new radio grant request at the network interface 632 and forwards the request to the grant request processing function 616 and further evaluates the request as described above.

Messages to recommend the requesting radio 120 to steer to a non-protected frequency, to inform the requesting radio 120 that their grant request is terminated, or to indicate a grant of their request, may be communicated by the grant request processing function 616 back to the requesting radio 120 via the network interface and network 650. Similarly, the SAS 130 and/or grant request processing function 616 may communicate with one or more peer SAS 131 via the network interface and network 650 to exchange information during CPAS periods or for other reasons.

EXAMPLE EMBODIMENTS

Example 1 includes a spectrum access system (SAS), the system comprising: a processor coupled to a memory; a network interface configured to communicatively couple the spectrum access system to a network, the processor coupled to the network interface; and a grant request processing function executed by the processor, wherein the grant request processing function processes grant requests received via the network interface from radios located in a neighborhood defined around a protection area, wherein the grant requests comprises a request to transmit on a protected frequency channel of the protected area; wherein the grant request processing function manages a timing of when to processes interference calculations associated with the grant requests based on or both of: determining whether to steer a requesting radio to a non-protected frequency channel; and at least one Q/N estimate power calculation, wherein Q comprises a value of an allowed interference power limit associated with the protected area, and N comprises a value representing a total number of authorized radios operating in the neighborhood.

Example 2 includes the system of Example 1, wherein the neighborhood is subdivided into a grant steering region (GSR) and a transmit power estimation region (TER); wherein the grant request processing function determines when to steer a requesting radio to a non-protected frequency channel based at least in part on whether a location of the requesting radio is within the GSR or within the TER.

Example 3 includes the system of Example 2, wherein the grant request processing function comprises: a GSR process for processing the grant requests within the GSR, and a TER process for processing the grant requests within the TER; wherein the GSR process and the TER process are executed outside a Coordinated Periodic Activities among SASes (CPAS) period of the SAS.

Example 4 includes the system of any of Examples 2-3, wherein a periphery of the GSR is defined as a function of a distance from the protection area.

Example 5 includes the system of any of Examples 2-4, wherein a periphery of the GSR is defined as a function of at least one RF parameter.

Example 6 includes the system of any of Examples 2-5, wherein whether a requesting radio is considered as being within the GSR or TER is defined based on a radio equipment characteristic.

Example 7 includes the system of any of Examples 1-6, wherein the total number of authorized radios operating in the neighborhood includes both client radios of the spectrum access system and peer radios of one or more peer SASes.

Example 8 includes the system of any of Examples 1-7, wherein the at least one Q/N estimate power calculation determines an estimate of a transmit power limit for the requesting radio corresponding to an interference power limit at at least one protection point of the protection area as a function of Q, N, and a path loss.

Example 9 includes the system of any of Examples 1-8, wherein the grant request processing function is configured to: determine an estimate of a transmit power limit for the requesting radio corresponding to an interference power limit at at least one protection point of the protection area as a function of Q, N, and a path loss; and determine when a transmit power requested by the requesting radio is within a t predetermined range of the transmit power limit for the requesting radio.

Example 10 includes the system of Example 9, wherein when the transmit power requested by the requesting radio is within the predetermined range of the transmit power limit for the requesting radio, the grant request processing function defers processing of a grant request from the requesting radio to a next Coordinated Periodic Activities among SASes (CPAS) period; and wherein when the transmit power requested by the requesting radio is not within the predetermined range of the transmit power limit for the requesting radio, the grant request processing function the grant request processing function send a message to the requesting radio to steer to a non-protected frequency channel.

Example 11 includes the system of any of Examples 1-10, wherein the grant request processing function is configured to execute a Coordinated Periodic Activities among SASes (CPAS) process during a CPAS period; wherein during the CPAS period, when a number of peer radio managed by one or more peer SAS in the neighborhood exceeds a peer radio threshold, the CPAS process is configured to determine an estimate of a transmit power limit for the requesting radio corresponding to an interference power limit at at least one protection point of the protection area as a function of Q, N, and a path loss; and determine when a transmit power requested by the requesting radio is within a predetermined range of the transmit power limit for the requesting radio; and when the number of peer radio managed by one or more peer SAS in the neighborhood does not exceed the peer radio threshold, the CPAS process is configured to execute an iterative allocation process during the CPAS period to process one or more of the grant requests.

Example 12 includes the system of any of Examples 1-11, wherein the protected area comprises a plurality of protection points; wherein the at least one Q/N estimate power calculation comprises a transmit power limit calculation with respect to the requesting radio for each protection point.

Example 13 includes a method for spectrum access system interference calculation management, the method comprising: receiving at a spectrum access system (SAS) a radio grant request from a requesting radio located in a neighborhood defined around a protection area, wherein the radio grant requests comprises a request to transmit on a protected frequency channel of the protected area; and managing a timing of when to processes interference calculations associated with the radio grant requests based on or both of: determining whether to steer a requesting radio to a non-protected frequency channel; and computing at least one Q/N estimate power calculation, wherein Q comprises a value of an allowed interference power limit associated with the protected area, and N comprises a value representing a total number of authorized radios operating in the neighborhood.

Example 14 includes the method of Example 13, wherein the neighborhood is subdivided into a grant steering region (GSR) and a transmit power estimation region (TER), the method further comprising: determining when to steer a requesting radio to a non-protected frequency channel based at least in part on whether a location of the requesting radio is within the GSR or within the TER.

Example 15 includes the method of any of Examples 13-14, wherein the total number of authorized radios operating in the neighborhood includes both client radios of the spectrum access system and peer radios of one or more peer SASes.

Example 16 includes the method of any of Examples 13-15, wherein computing at least one Q/N estimate power calculation further comprises: determining an estimate of a transmit power limit for the requesting radio corresponding to an interference power limit at at least one protection point of the protection area as a function of Q, N, and a path loss.

Example 17 includes the method of Example 16, further comprising: determining when a transmit power requested by the requesting radio is within a t predetermined range of the transmit power limit for the requesting radio.

Example 18 includes the method of Example 17, further comprising: when the transmit power requested by the requesting radio is within the predetermined range of the transmit power limit for the requesting radio, deferring processing of the radio grant request from the requesting radio to a next Coordinated Periodic Activities among SASes (CPAS) period; and when the transmit power requested by the requesting radio is not within the predetermined range of the transmit power limit for the requesting radio, sending a message to the requesting radio to steer to a non-protected frequency channel.

Example 19 includes the method of any of Examples 13-18, further comprising: executing a Coordinated Periodic Activities among SASes (CPAS) process during a CPAS period, the CPAS process comprising: determining when a number of peer radio managed by one or more peer SAS in the neighborhood exceeds a peer radio threshold; when the number of peer radio managed by the one or more peer SAS in the neighborhood exceeds the peer radio threshold, determining an estimate of a transmit power limit for the requesting radio corresponding to an interference power limit at at least one protection point of the protection area as a function of Q, N, and a path loss, and determining when a transmit power requested by the requesting radio is within a predetermined range of the transmit power limit for the requesting radio; and when the number of peer radio managed by the one or more peer SAS in the neighborhood does not exceed the peer radio threshold, the CPAS process is configured to execute an iterative allocation process during the CPAS period to process one or more of the radio grant requests.

Example 20 includes the method of any of Examples 13-19, wherein the protected area comprises a plurality of protection points, wherein computing at least one Q/N estimate power calculation comprises: computing a Q/N estimate power calculation to determine a transmit power limit calculation with respect to the requesting radio for each protection point.

In various alternative embodiments, system and/or device elements, method steps, or example implementations described throughout this disclosure (such as any of the spectrum access system, CBSDs, radios, grant request processing function, GSR process, TER prosses, CPAS process, protected area data, neighborhood data, terrain data, databases, network interface, or any controllers, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, wireless radio communications related terms such as: spectrum access system (SAS), citizens broadband radio service (CBRS), shared spectrum, radio, citizen broadband radio service device (CBSD), Coordinated Periodic Activities among SASes (CPAS), protected area, protection point, processor, memory, database, network interface, network, refer to the names of elements that would be immediately recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A spectrum access system (SAS), the system comprising:
    a processor coupled to a memory;
    a network interface configured to communicatively couple the spectrum access system to a network, the processor coupled to the network interface; and
    a grant request processing function executed by the processor, wherein the grant request processing function processes grant requests received via the network interface from radios located in a neighborhood defined around a protection area, wherein the grant requests comprises a request to transmit on a protected frequency channel of the protected area;
    wherein the grant request processing function manages a timing of when to processes interference calculations associated with the grant requests based on or both of:
        determining whether to steer a requesting radio to a non-protected frequency channel; and
        at least one Q/N estimate power calculation, wherein Q comprises a value of an allowed interference power limit associated with the protected area, and N comprises a value representing a total number of authorized radios operating in the neighborhood.

2. The system of claim 1, wherein the neighborhood is subdivided into a grant steering region (GSR) and a transmit power estimation region (TER);
    wherein the grant request processing function determines when to steer a requesting radio to a non-protected frequency channel based at least in part on whether a location of the requesting radio is within the GSR or within the TER.

3. The system of claim 2, wherein the grant request processing function comprises:
a GSR process for processing the grant requests within the GSR, and
a TER process for processing the grant requests within the TER;
wherein the GSR process and the TER process are executed outside a Coordinated Periodic Activities among SASes (CPAS) period of the SAS.

4. The system of claim 2, wherein a periphery of the GSR is defined as a function of a distance from the protection area.

5. The system of claim 2, wherein a periphery of the GSR is defined as a function of at least one RF parameter.

6. The system of claim 2, wherein whether a requesting radio is considered as being within the GSR or TER is defined based on a radio equipment characteristic.

7. The system of claim 1, wherein the total number of authorized radios operating in the neighborhood includes both client radios of the spectrum access system and peer radios of one or more peer SASes.

8. The system of claim 1, wherein the at least one Q/N estimate power calculation determines an estimate of a transmit power limit for the requesting radio corresponding to an interference power limit at at least one protection point of the protection area as a function of Q, N, and a path loss.

9. The system of claim 1, wherein the grant request processing function is configured to:
determine an estimate of a transmit power limit for the requesting radio corresponding to an interference power limit at at least one protection point of the protection area as a function of Q, N, and a path loss; and
determine when a transmit power requested by the requesting radio is within a t predetermined range of the transmit power limit for the requesting radio.

10. The system of claim 9, wherein when the transmit power requested by the requesting radio is within the predetermined range of the transmit power limit for the requesting radio, the grant request processing function defers processing of a grant request from the requesting radio to a next Coordinated Periodic Activities among SASes (CPAS) period; and
wherein when the transmit power requested by the requesting radio is not within the predetermined range of the transmit power limit for the requesting radio, the grant request processing function the grant request processing function send a message to the requesting radio to steer to a non-protected frequency channel.

11. The system of claim 1, wherein the grant request processing function is configured to execute a Coordinated Periodic Activities among SASes (CPAS) process during a CPAS period;
wherein during the CPAS period, when a number of peer radio managed by one or more peer SAS in the neighborhood exceeds a peer radio threshold, the CPAS process is configured to determine an estimate of a transmit power limit for the requesting radio corresponding to an interference power limit at at least one protection point of the protection area as a function of Q, N, and a path loss; and determine when a transmit power requested by the requesting radio is within a predetermined range of the transmit power limit for the requesting radio; and
when the number of peer radio managed by one or more peer SAS in the neighborhood does not exceed the peer radio threshold, the CPAS process is configured to execute an iterative allocation process during the CPAS period to process one or more of the grant requests.

12. The system of claim 1, wherein the protected area comprises a plurality of protection points;
wherein the at least one Q/N estimate power calculation comprises a transmit power limit calculation with respect to the requesting radio for each protection point.

13. A method for spectrum access system interference calculation management, the method comprising:
receiving at a spectrum access system (SAS) a radio grant request from a requesting radio located in a neighborhood defined around a protection area, wherein the radio grant requests comprises a request to transmit on a protected frequency channel of the protected area; and
managing a timing of when to processes interference calculations associated with the radio grant requests based on or both of:
determining whether to steer a requesting radio to a non-protected frequency channel; and
computing at least one Q/N estimate power calculation, wherein Q comprises a value of an allowed interference power limit associated with the protected area, and N comprises a value representing a total number of authorized radios operating in the neighborhood.

14. The method of claim 13, wherein the neighborhood is subdivided into a grant steering region (GSR) and a transmit power estimation region (TER), the method further comprising:
determining when to steer a requesting radio to a non-protected frequency channel based at least in part on whether a location of the requesting radio is within the GSR or within the TER.

15. The method of claim 13, wherein the total number of authorized radios operating in the neighborhood includes both client radios of the spectrum access system and peer radios of one or more peer SASes.

16. The method of claim 13, wherein computing at least one Q/N estimate power calculation further comprises:
determining an estimate of a transmit power limit for the requesting radio corresponding to an interference power limit at at least one protection point of the protection area as a function of Q, N, and a path loss.

17. The method of claim 16, further comprising:
determining when a transmit power requested by the requesting radio is within a t predetermined range of the transmit power limit for the requesting radio.

18. The method of claim 17, further comprising:
when the transmit power requested by the requesting radio is within the predetermined range of the transmit power limit for the requesting radio, deferring processing of the radio grant request from the requesting radio to a next Coordinated Periodic Activities among SASes (CPAS) period; and
when the transmit power requested by the requesting radio is not within the predetermined range of the transmit power limit for the requesting radio, sending a message to the requesting radio to steer to a non-protected frequency channel.

19. The method of claim 13, further comprising:
executing a Coordinated Periodic Activities among SASes (CPAS) process during a CPAS period, the CPAS process comprising:

determining when a number of peer radio managed by one or more peer SAS in the neighborhood exceeds a peer radio threshold;

when the number of peer radio managed by the one or more peer SAS in the neighborhood exceeds the peer radio threshold, determining an estimate of a transmit power limit for the requesting radio corresponding to an interference power limit at at least one protection point of the protection area as a function of Q, N, and a path loss, and determining when a transmit power requested by the requesting radio is within a predetermined range of the transmit power limit for the requesting radio; and when the number of peer radio managed by the one or more peer SAS in the neighborhood does not exceed the peer radio threshold, the CPAS process is configured to execute an iterative allocation process during the CPAS period to process one or more of the radio grant requests.

20. The method of claim 13, wherein the protected area comprises a plurality of protection points, wherein computing at least one Q/N estimate power calculation comprises:
computing a Q/N estimate power calculation to determine a transmit power limit calculation with respect to the requesting radio for each protection point.

* * * * *